United States Patent [19]

Kawasaki et al.

[11] 4,321,783
[45] Mar. 30, 1982

[54] MID-MOUNTED MOWER

[75] Inventors: Masami Kawasaki; Hirofumi Sadakane, both of Sakai, Japan

[73] Assignee: Kubota, Ltd., Osaka, Japan

[21] Appl. No.: 134,454

[22] Filed: Mar. 27, 1980

[30] Foreign Application Priority Data

Apr. 7, 1979 [JP] Japan .............................. 54-46126[U]
Aug. 20, 1979 [JP] Japan ............................ 54-115124[U]
Aug. 22, 1979 [JP] Japan ............................ 54-116198[U]

[51] Int. Cl.³ .................... A01D 35/264; A01D 55/28
[52] U.S. Cl. ...................................... 56/15.8; 56/16.2; 56/DIG. 22
[58] Field of Search ...................... 56/14.9, 15.2, 15.7, 56/15.8, 202, 16.3, 17.1, 17.2, DIG. 22, 16.2; 248/421, 564, 584; 74/106, 520

[56] References Cited

U.S. PATENT DOCUMENTS

| | | | |
|---|---|---|---|
| 2,041,615 | 5/1936 | Maslowski | 248/421 |
| 3,205,642 | 9/1965 | Smith | 56/15.2 |
| 3,672,137 | 6/1972 | Hamouz et al. | 56/15.8 |
| 3,796,028 | 3/1974 | Federspiel | 56/15.2 |
| 3,969,876 | 7/1976 | Turos | 56/202 |
| 4,102,114 | 7/1978 | Estes et al. | 56/15.2 |
| 4,106,272 | 8/1978 | Peterson et al. | 56/202 |

Primary Examiner—Robert A. Hafer
Attorney, Agent, or Firm—Armstrong, Nikaido, Marmelstein & Kubovcik

[57] ABSTRACT

A mid-mounted mower disposed below the body of a tractor is suspended from the tractor body upwardly or downwardly movably by a pair of opposed flexible link assemblies each flexible about an axis extending longitudinally of the tractor body. During mowing the mower is movable up and down following rises and falls of the ground, while when running on a road or the like, the mower is lifted in a substantially horizontal position by a hydraulic cylinder connected between the pair of link assemblies, or by a hydraulic unit in a rear portion of the tractor body through wires.

12 Claims, 20 Drawing Figures

MID-MOUNTED MOWER

BACKGROUND OF THE INVENTION

This invention relates to a mid-mounted mower attached to the bottom of a vehicle.

Mid-mounted mowers attached to vehicles, such as farm tractors, on the bottom of the body thereof must be adapted to move up and down along the undulations of the ground so as to crop lawn and grass at a constant height from the ground. Accordingly the tractor body is provided on its bottom with parallel link assemblies for supporting the mower with chains or like suspending wires. The mower is also connected to the tractor body with pulling bars which are pivoted to the front end of the body upwardly or downwardly turnably. The parallel link assemblies are connected by lifting wires to lift arms for a hydraulic unit mounted on a rear portion of the tractor body for lifting or lowering a working implement. For operation, the mower on the ground is supported by the suspending wires with an excessive length so as to move up and down along the unduations of the ground within the range provided by the excessive length. However, when the mower is mounted on the tractor body by the means described above, the mower, which is connected to the body at many portions, requires a cumbersome procedure for installation and removal. Moreover when moving upward or downward, the mower is likely to move longitudinally of the tractor relative thereto and come into contact with the wheels. Thus there arises the need to give a large wheelbase to the tractor relative to the width of the mower longitudinal of the tractor. Since the ability of the mower to follow the ground surface is dependent largely on the excessive length of the suspending wires which is determined with the mower positioned on the ground, the suspending wires must always have a predetermined excessive length which must be large enough when mowing a markedly undulating field. However, if the suspending wires have an excessive length, the mower, when lifted, will be at a level which is lower than otherwise in corresponding relation to the excess. Whereas the mower must be at a higher level when travelling on an irregular-surfaced ground involving marked rises and falls, the mower will actually be at a lower level. Consequently there arises the necessity of adjusting the suspending wires to a shorter length before lifting the mower.

SUMMARY OF THE INVENTION

A first object of the present invention is to provide a mid-mounted mower which is liftably attached to the bottom of the body of a vehicle by very simple, compact and flexible link assemblies so as to be straightforwardly movable upward or downward.

A second object of the invention is to provide a mid-mounted mower which is attached to the vehicle body by flexible link assemblies each flexible only about a longitudinal axis, without necessitating any mounting member other than the link assemblies so as to be mountable on and demountable from the body easily and rapidly.

A third object of the invention is to provide a mid-mounted mower of the type described above in which the flexible link assemblies are prevented from flexing longitudinally of the vehicle body in an unbalanced fashion so as to render the mower straightforwardly movable upward or downward.

A fourth object of the invention is to provide a mid-mounted mower which is adapted to freely follow the rise and fall of the ground during mowing.

A fifth object of the invention is to provide a mid-mounted mower which is retainable at a lifted position a sufficient distance above the ground, for example, during running on a road.

A sixth object of the invention is to provide a mid-mounted mower which is reliably lockable in its lifted position to the vehicle body.

Other objects, features and advantages of the invention will become more apparent from the following description with reference to the accompanying drawings.

DESCRIPTION OF THE PREFERRED EMBODIMENTS

Figure 1:
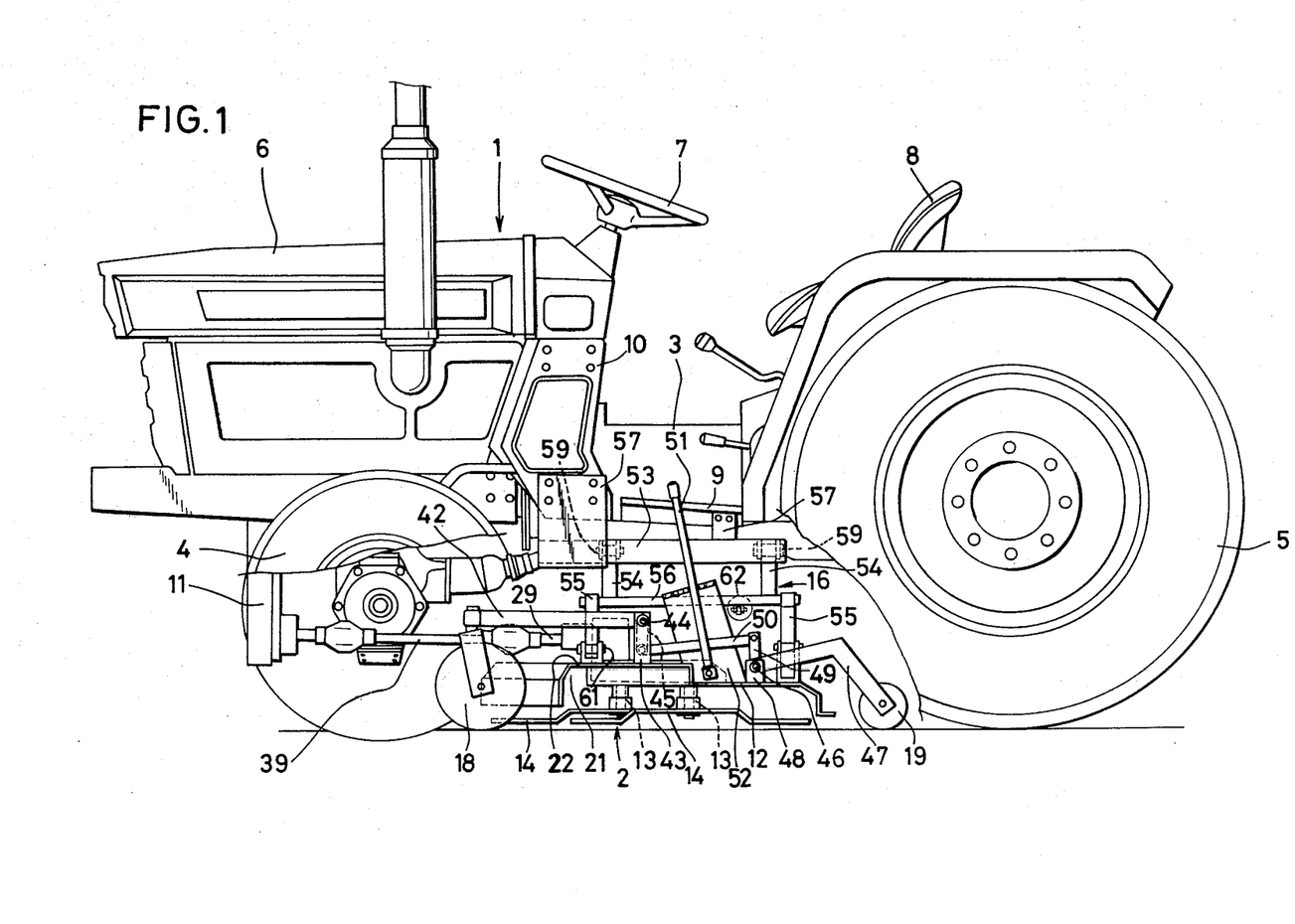
FIG. 1 is a side elevation partly broken away and showing a first embodiment of the invention as attached to a farm tractor.
Figure 2:
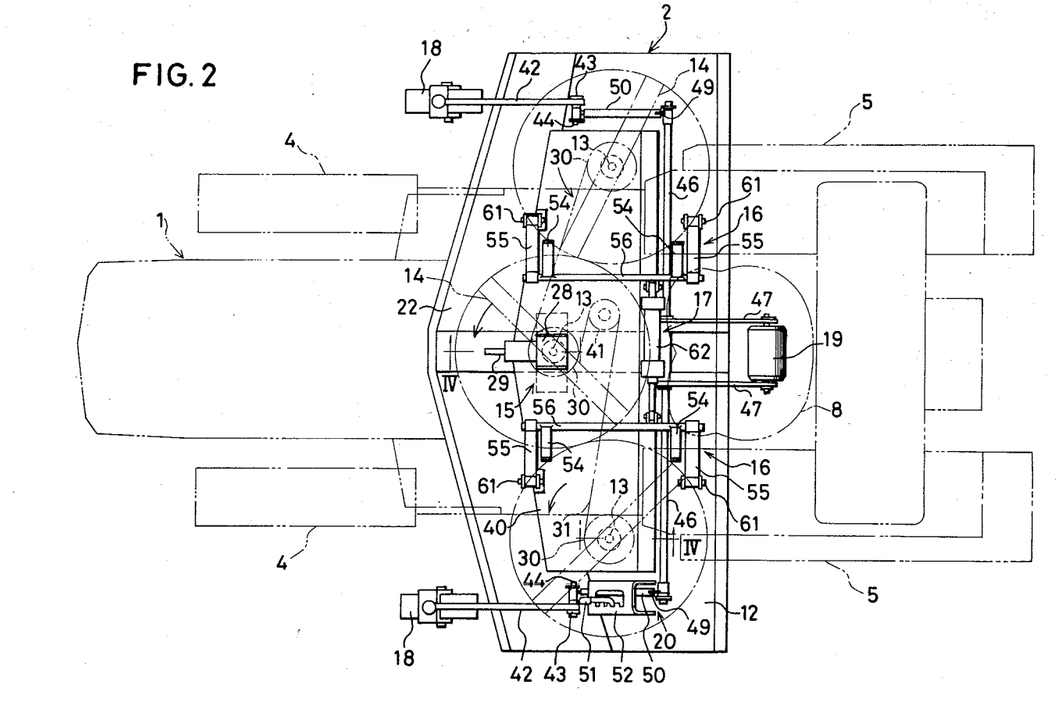
FIG. 2 is a plan view of the same in which the tractor is shown schematically.
Figure 3:
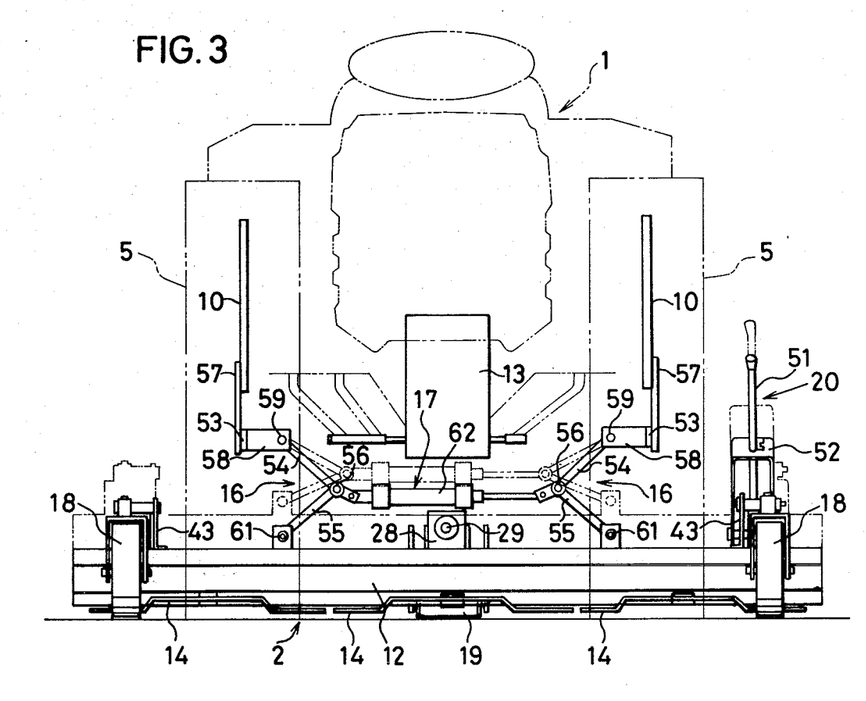
FIG. 3 is a front view of the same with the tractor shown schematically.

FIGS. 1 to 3 show a mid-mounted mower 2 as mounted on a farm tractor 1. The tractor 1 has a body 3 including an engine, a transmission case, etc. as its structural elements. The tractor body 3 is provided with front wheels 4, rear wheels 5, a bonnet 6, a steering wheel 7, a driver's seat 8, steps 9, brackets 10 for mounting the mower 2, etc. and has a power take-off unit 11 at a front portion thereof. The steps 9 and brackets 10 are disposed on opposite sides of the tractor body 3 approximately at the midportion longitudinally thereof. The power take-off unit 11 is detachably attached to the front end of the tractor body 3 so as to be coupled to a front PTO shaft projecting forward from the engine.

The mower 2 comprises a mower frame 12 disposed below the tractor body 3, cutting blades 14 supported by the mower frame 12 and rotatable about vertical shafts 13, a drive unit 15 mounted on the mower frame 12 for driving the blades 14, a pair of opposed flexible link assemblies 16 suspending the mower frame 12 from the tractor body 3 detachably and upwardly or downwardly movably and each flexible about a longitudinal axis, lifting means 17 for flexing or stretching the link assemblies 16 substantially to the same extent to lower or lift the mower frame 12, front gauge wheels 18 and a rear gauge wheel 19 upwardly or downwardly pivotably supported by the mower frame 12, and means 20 for adjusting the cutting blades 14 to the desired cutting height by moving the gauge wheels 18 and 19 upward or downward.

Figure 4:
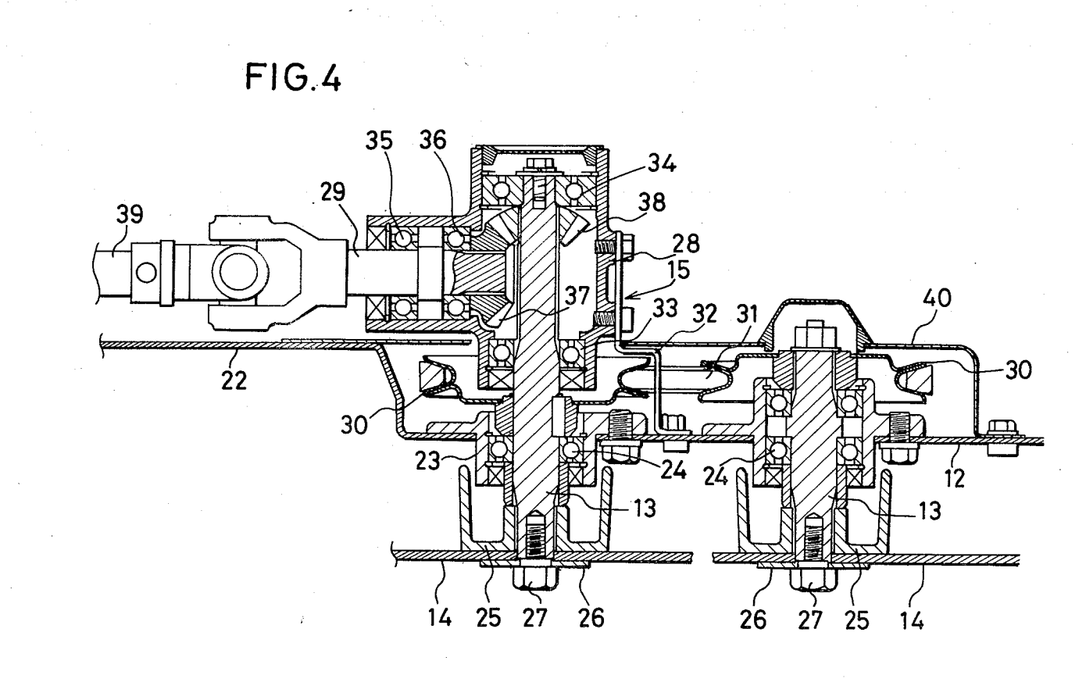
FIG. 4 is an enlarged view in section taken along the line IV—IV in FIG. 2.

At the front side of the mower frame 12, a discharge guide 22 extending transversely of the body projects upward to define a discharge space 21 through which the grass cropped with the cutting blades 14 is discharged from the front thereof sidewise of the body. The guide 22 extends into a stepped lower portion. Three cutting blades 14 rotatable about the vertical shafts 13 are arranged on the mower frame 12 transversely of the body. As shown in FIG. 4, each of the vertical shafts 13 is rotatably supported by a ball bearing 24 on a bearing case 23 disposed to the rear of the guide 22 and mounted on the mower frame 12. The cutting blade is fastened to the lower end of the vertical shaft 13 by a blade support 25, dish spring 26 and bolt 27. The blade 14 is in the form of a strip and is held between the blade support 25 and the spring 26. The blade 14 is rotatable relative to the support 25, etc. when excessively loaded.

The drive unit 15 serves as an element of the system for driving the cutting blades 14 with the power from the front power take-off unit 11 and is mounted on the mower frame 12 to the rear of the guide 22. As seen in FIG. 4, the drive unit 15 comprises a gear box 28, input shaft 29, pulleys 30, a belt 31, etc. The gear box 28 is provided for the center shaft 13 supported by a pair of brackets 32 on the mower frame 12 and held a specified distance above the frame 12. The center shaft 13 is housed in the gear box 28 and rotatably supported by ball bearings 33 and 34. The input shaft 29 rotatably supported by the gear box 28 with ball bearings 35 and 36 is coupled to the center shaft 13 by bevel gears 37 and 38 within the box 28. The input shaft 29 projects forward from the gear box 28 and is coupled to the front power take-off unit 11 by a universal joint shaft 39. The pulleys 30 are fixedly mounted on the vertical shafts 13 and positioned at a lower level than the top wall of the projecting guide 22. The belt 31 is reeved around the pulleys 30. The pulleys 30 and belt 31 are covered with the mower frame 12 and a cover 40 from below and above. The belt 31 is tensioned by a tension pulley 41.

The front gauge wheels 18 are disposed in front of the mower frame 12 at its opposite ends. Each of the wheels 18 is of caster wheel construction and is supported by the front end of a front arm 42. The front arm 42 is upwardly or downwardly pivotably supported by a pin 44 on a bracket 43 fixed to each end of the mower frame 12. The front arm 42 is provided at its base end with a downwardly extending coupling link 45. The rear gauge wheel 19 is positioned to the rear of the midportion of the mower frame 12. The rear gauge wheel 19 is supported by a pair of rear arms 47 secured to a coupling rod 46, which is turnably supported by brackets 48 at rear portions of the mower frame 12. Coupling links 49 corresponding to the coupling links 45 extend upward from both ends of the rod 45. The coupling links 45 and 49 are interconnected by connecting bars 50.

The cutting height adjusting means 20 comprises an adjusting lever 51 connected to one of the connecting bars 50 and pivoted to a guide plate 52 forwardly or backwardly turnably. The adjusting lever 51 is movable by the driver seated in the seat 8. The guide plate 52 is provided with means for locking the lever 51 in its turned position.

Figure 5:
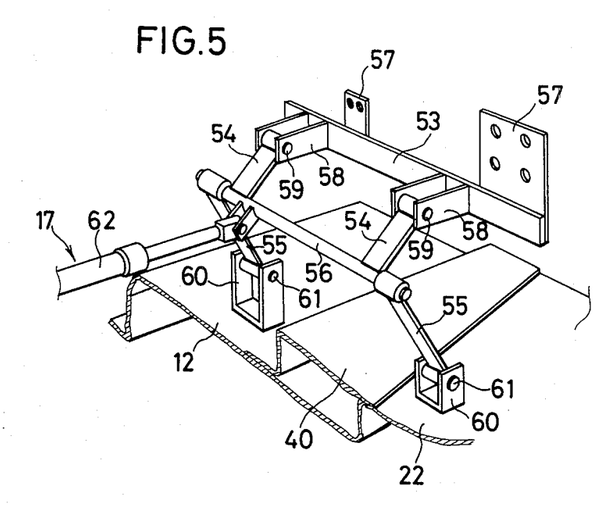
FIG. 5 is a perspective view showing a flexible link assembly on one side as it is seen from inside.

Each of the flexible link assemblies 16 comprises a mounting bracket 53, a pair of upper links 54, a pair of lower links 55 and a connecting rod 56 as seen in FIG. 5. The mounting bracket 53 extends longitudinally of the tractor body 3 on each side of its lower portion and is detachably attached from outside to the bracket 10 and step 9 by a pair of front and rear brackets 57 and bolts. The upper end of each upper link 54 is supported on a pin 59 extending longitudinally of the body 3 and mounted on a pair of opposed brackets 58 projecting from inner side of the bracket 53. The upper links 54 are attached at their lower ends to opposite end portions of the connecting rod 56 which extends longitudinally of the tractor. The lower links 55 have upper ends turnably fitting around the front and rear ends of the connecting rod 56 and lower ends each supported by a pin 61 on a bracket 60 projecting from the mower frame 12. Thus each flexible link assembly 16 is flexible only about a longitudinal axis but is in no way turnable about a transverse axis.

The lifting means 17 comprises, for example, a singly operable hydraulic cylinder 62 which is disposed to the rear of the drive unit 15 transversely of the body 3 and connected between brackets 63 fixed to the connecting rods 56. With the flexible link assemblies 16, the connecting rods 56 are positioned laterally inwardly of the pins 59 and 61 on the outer ends of the links 54 and 56. Accordingly the cylinder 62 has a short length.

The mower 2 will be mounted on the tractor in the following manner. The mower 2 is placed below the tractor body 3 transversely through the space between the front and rear wheels 4 and 5, with the link assemblies 16 folded on the mower frame 12 and the hydraulic cylinder placed on the mower frame 12. The mounting brackets 53 are then brought up and fastened to the brackets 10 and steps 9 on opposite sides of the tractor body 3 from outside. The brackets 53, which are located laterally outwardly of the tractor body 3, can be attached to the body 3 with ease. Subsequently the input shaft 29 of the gear box 28 is connected to the front power take-off unit 11 with the universal joint shaft 39. Thus the mower 2 is easily mountable on the tractor body 3.

For mowing, the mower 2 is first pulled up in its entirety. With the gauge wheels 18 and 19 held out of contact with the ground, the adjusting lever 51 is moved forward or backward to adjust the cutting blades 14 to the desired cutting height. The adjusting lever 51, when moved forward or backward, moves the connecting bars 50 forward or backward, causing the coupling links 45 and 49 to turn the front arms 42 and the rear arms 47 upward or downward about the pins 44 and the connecting rod 46 respectively and thereby bringing the front gauge wheels 18 and rear gauge wheel 19 upward or downward relative to the mower frame 12. The adjusting lever 51 is locked with the front and rear gauge wheels 18 and 19 at the desired level, whereby the mower 2 is completely adjusted to the desired cutting height.

To initiate a mowing operation, the hydraulic cylinder 62 is made free to stretch or collapse, and the mower 2 is lowered in its entirety with the front gauge wheels 19 and the rear gauge wheel 19 brought into contact with the ground. The tractor is driven with the cutting blades 14 rotated in the direction of arrows in FIG. 2 by the power from the front power take-off unit 11. More specifically stated, the power from the unit 11 is delivered through the universal joint shaft 39 to the input shaft 29 of the gear box 28, from which the power is transmitted via the bevel gears 37, 38 in the box 28, the center vertical shaft 13, the pulley 30, the belt 31, other vertical shafts 13, etc. to the cutting blades 14, whereby the blades 14 are driven about their vertical shafts 13 in the direction of the arrows shown in FIG. 2. Since the flexible link assemblies 16 are each foldable about a longitudinal axis, with each pair of front and rear upper links 54 connected together by the connecting rod 56, the tractor body 3, when driven, pulls the mower 2 through the link assemblies 16, permitting the mower 2 to run with the tractor body 3 on rolling wheels 18 and 19 and to crop grass or lawn at a constant cutting height with the blades 14 in rotation. By virtue of the rotation of the blades 14, the grass or lawn cut off is continuously discharged along the guide 22 sidewise. During mowing, the hydraulic cylinder 62 which is in a free state permits each of the link assemblies 16 to flex or stretch independently of the other, enabling the mower 2 to follow rises and falls of the ground accurately. When the cutting blade 14 is overloaded during mowing by contact with an obstacle, such as a stub, the blade 14, which is elastically held to the support 25 by the dish spring 26, rotates relative to the support 25, whereby the damage to the blade 14 or malfunction of the power transmission system can be avoided.

To lift the mower 2, working oil is fed to the hydraulic cylinder 62 to contract the cylinder 62, which in turn pulls the connecting rods 56 laterally inward with equal forces, flexing the link assemblies 16 to the same extent and causing the mower frame 12 to raise the mower 2 in its entirety. Since the two pairs of front and rear upper links 54 of the link assemblies 16 are each connected together by the connecting rod 56, the pairs of upper links 54, as well as the pairs of lower links 55, will be flexed equally. Consequently the contraction of the hydraulic cylinder 62 raises the mower 2 substantially straightforwardly, without allowing the mower 2 to contact the front or rear wheels 4 or 5 due to forward or rearward movement. Since the connecting rods 56 are located laterally inwardly of the combined assemblies 16 with the cylinder 62 connected therebetween in a lateral position, the cylinder 62 can be of short length, and there is no likelihood of the assemblies projecting greatly outward sidewise every time the mower 2 is lifted or lowered. Thus the combined link assemblies can be compact. Further because the drive unit 15 including the gear box 28 is located to the rear of the discharge guide 22 of the mower frame 12, with the lateral cylinder 62 disposed further to the rear of the drive unit 15, the unit 15 involves a reduced amount of upward projection and will not interfere with the cylinder 62, enabling the mower frame 12 to rise to a level proximate to the tractor body 3. Consequently the mower 2 can be lifted to a higher level in its entirety.

To lower the mower 2, the valve for the hydraulic cylinder 62 is switched to draw off the working oil from the cylinder 62 under the gravity acting on the mower 2 itself. The mower 2 will then lower straightforwardly as when rising.

Figure 6:
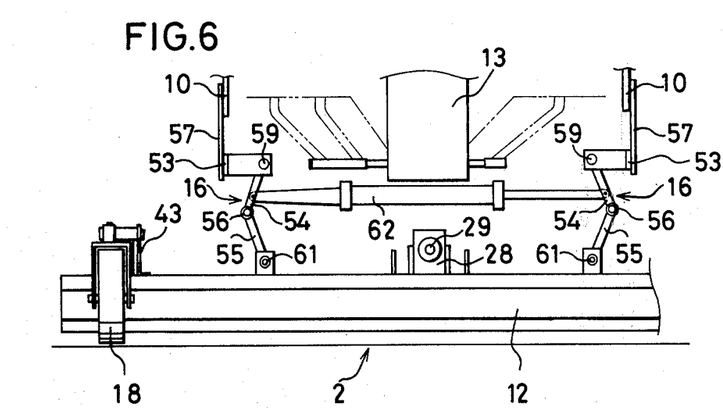
FIG. 6 is a fragmentary front view showing a second embodiment of the invention.

FIG. 6 shows another embodiment in which the link assemblies 16 are flexible in directions opposite to the above. The assemblies 16 are so flexed that connecting rods 56 are positioned laterally outwardly of pins 59, 61 on upper and lower links 54, 55, with a hydraulic cylinder connected between the upper links 54 in a lateral position. To maintain the assemblies 16 in balance with each other, the cylinder 62 has its main body located in the midportion between the assemblies 16. The hydraulic cylinder 62 in this case must be stretched when lifting the mower 2, while the mower 2 can be lowered under gravity as is the case with the first embodiment.

Figures 7, 8:
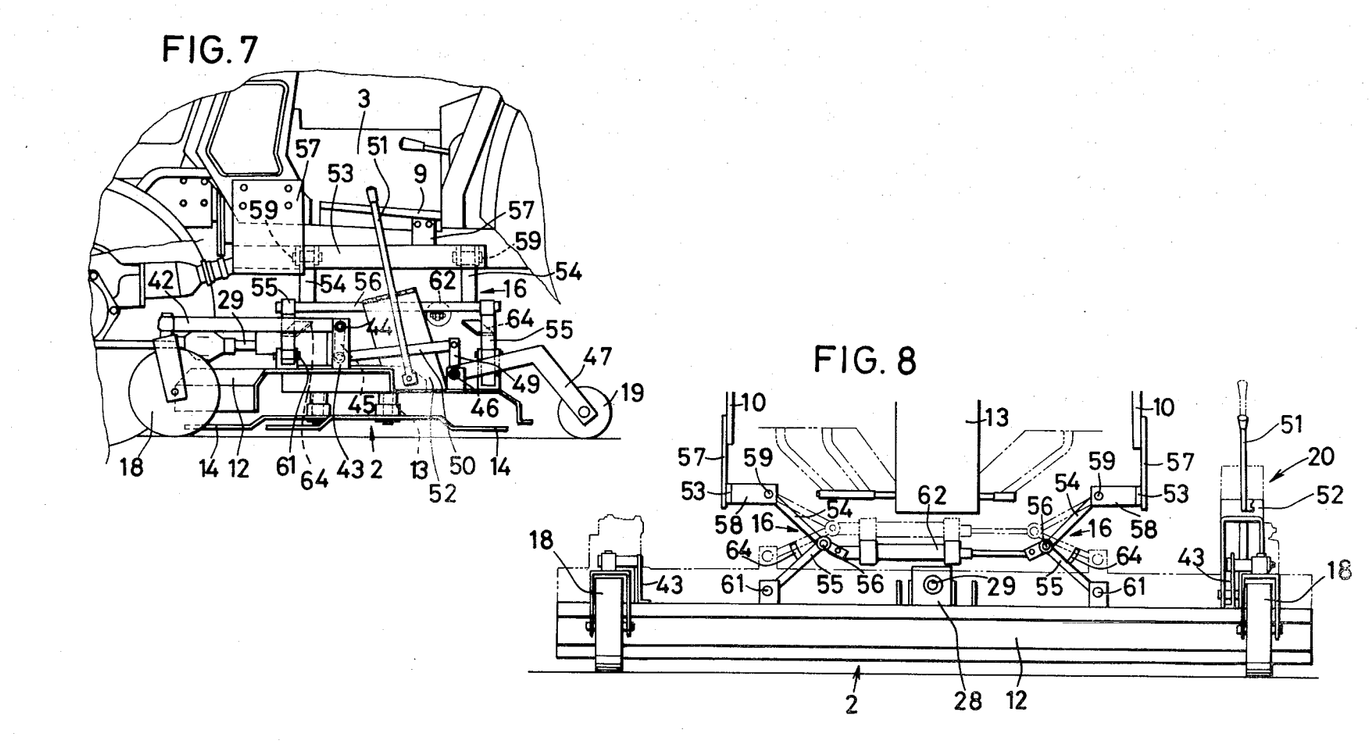
FIG. 7 is a side elevation partly in section and showing a third embodiment of the invention as attached to a farm tractor which is partly broken away.
FIG. 8 is a front view of the same in which the body of the tractor is shown schematically.

FIGS. 7 and 8 show another embodiment in which the flexible link assemblies 16 are each provided with stoppers 64 for limiting the flexing of the link assemblies 16 when lifting the mower 2. The stopper 64 projects from each lower link 55 and is adapted to come into contact with the opposed upper link 54 to prevent the hydraulic cylinder 62 from contacting the tractor body 3 during the rise of the mower 2.

Upon the mower 2 rising to the phantom-line position in FIG. 8, the stoppers 64 bear against the upper links 54, preventing the link assemblies 16 from further flexing to hold the cylinder 62 out of contact with the tractor body 3 and thereby protect the cylinder 62, especially the piping therefor, from damage. If the hydraulic circuit for the cylinder 62 is locked when the link assemblies 16 have become no longer flexible, the overall arrangement including the link assemblies 16, cylinder 62, etc. acts as a kind of rigid body to fixedly connect the mower 2 to the tractor body 3 with high stability and hold the mower 2 against movement during running.

The stoppers 64 may be provided on the upper links 54, while the link assembly may be made flexible in the opposite direction.

Figure 9:
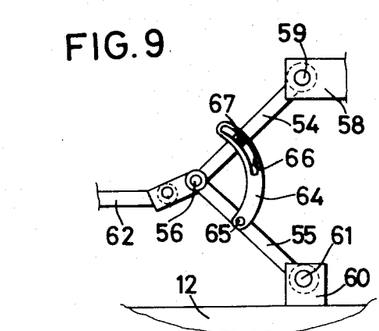
FIG. 9 is a front view showing a flexible link assembly according to a fourth embodiment of the invention.

FIG. 9 shows another embodiment of the stopper 64 in the form of an arcuate member. This stopper 64 is pivoted to the lower link 55 by a pin 65 and formed in its free end with a slot 66. A pin 67 slidably engaging in the slot 66 is fixed to the upper link 54. The flexing or stretching range of the link assembly 16 is determined by the slot 66. Accordingly the stopper 64 defines the upper limit, as well as the lower limit, of the movement of the mower 2.

Figure 10:
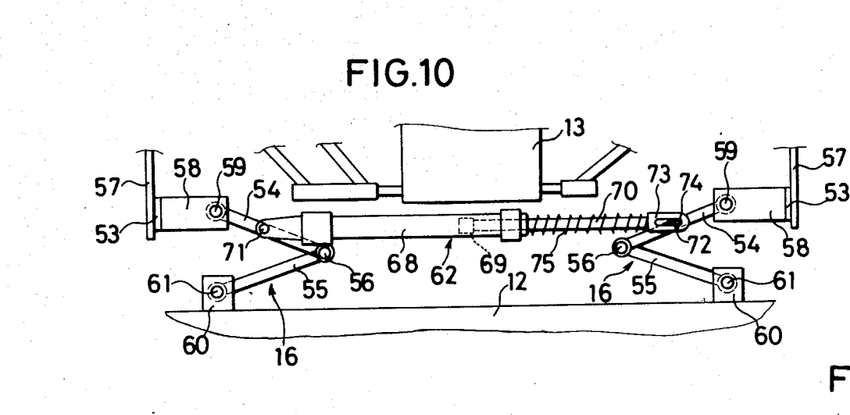
FIG. 10 is a fragmentary front view showing a fifth embodiment of the invention in its lifted position.
Figure 11:
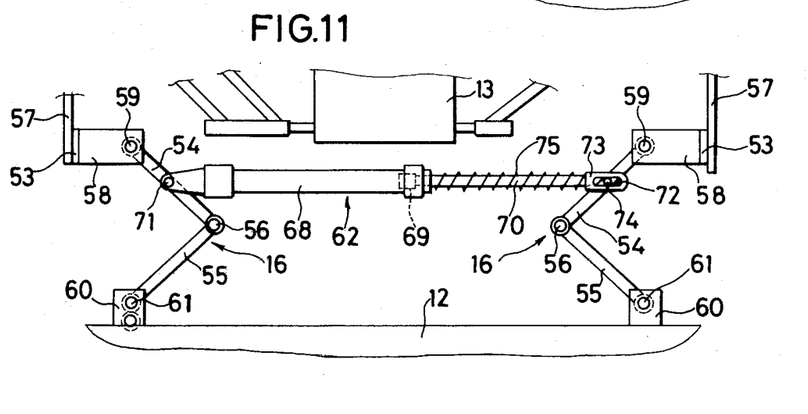
FIG. 11 is a fragmentary front view showing the same during operation.

FIGS. 10 and 11 show an arrangement for connecting a hydraulic cylinder 62 to flexible link assemblies 16. The cylinder 62 is of the single operating type comprising a main body 68, a piston 69 and a piston rod 70. The cylinder main body 68 is connected by a pin 71 to the upper link 54 of one of the link assemblies 16, while the piston rod 70 has at its free end a connector 73 having a longitudinal slot 72 and is connected to the upper link 54 of the other link assemblies 16 by a pin 74 engaging in the slot 72 slidably. A coiled spring 75 is fitted around the piston rod 70 between the cylinder main body 68 and the connector 73 for biasing the rod 70 outward to stretch the cylinder 62. The arrangement is so dimensioned that when the mower 2 is in contact with the ground at a specified cutting height, the cylinder 62 is in the most stretched state, with the pin 74 positioned approximately at the middle of the slot 72.

Accordingly even if the cylinder 62 is hydraulically locked, the mower 2 is movable up and down within the range determined by the slot 74.

More specifically stated, when the mower 2 is in its lifted position, the cylinder 62 is in its contracted state with the pin 74 positioned at the outer end of the slot 72 as seen in FIG. 10. As the working oil is released from the cylinder 62 to lower the mower 2, the cylinder is stretched by the weight of the mower 2 itself until the front gauge wheels 18 and the rear gauge wheel 19 come into contact with the ground. The cylinder 62 is thereafter stretched to the largest length by the action of the coiled spring 75 to position the pin 74 approximately in the middle of the slot 72 in the connector 73 as seen in FIG. 11. Thus even when the valve for the cylinder 62 is switched to its neutral position after the cylinder 62 has been stretched to the largest length, the link assemblies 16 are free to flex within the range determined by the slot 72, permitting the mower 2 to rise and fall in accordance with the undulations of the ground.

Figure 12:
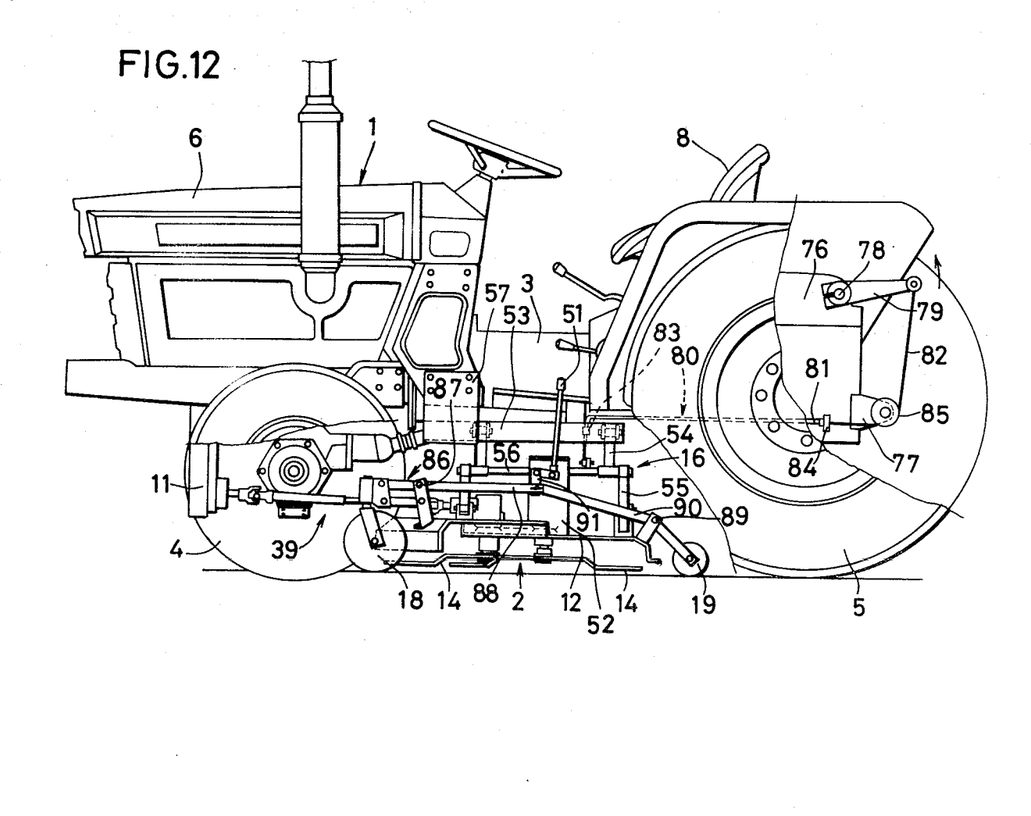
FIG. 12 is a side elevation showing a sixth embodiment of the invention with a farm tractor partly broken away.
Figure 13:
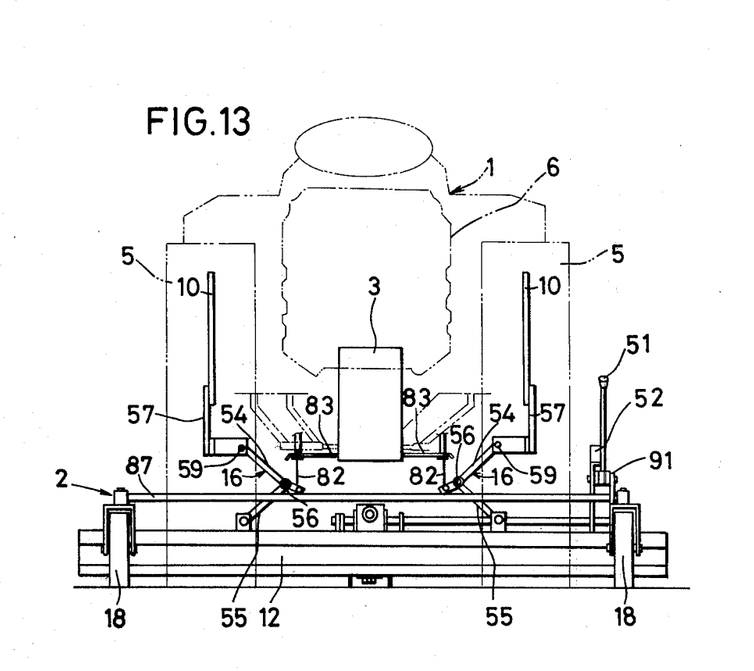
FIG. 13 is a front view showing the same with the tractor shown schematically.

FIGS. 12 and 13 show another embodiment in which the lifting means 17 comprises a hydraulic unit 76 mounted on a rear portion of the tractor body 3 for lifting or lowering a working implement. The hydraulic unit 76 is provided with a pair of opposed lift arms 79 upwardly or downwardly turnable about an arm shaft 78. Each of the link assemblies 16 is coupled to each of the lift arms 79 by a push-pull wire 80. The push-pull wire 80 comprises an outer wire 81 and an inner wire 82 slidably extending through the outer wire 81. The outer wire 81 has one end attached to an outer wire support member 83 projecting from the tractor body 3 and positioned close to the rear end of the connecting rod 56 and the other end attached to an outer wire support member 84 provided at a rear end lower portion of the body at each side thereof. The inner wire 82 has one end attached to the connecting rod 56 below the support member 83 and the other end passed over a guide ring 85 and connected to the lift arm 79. The guide ring 85 is rotatably supported by a bracket on a rear end portion of the tractor body 3. The front gauge wheels 18 are upwardly or downwardly movably supported by the mower frame 12 with parallel link mechanisms 86 in pair. The parallel link mechanisms 86 are coupled to each other by a rod 87. One of the link mechanisms 86 includes an upper link 88 which extends to a position close to an adjusting lever 51. The rear gauge wheel 19 is upwardly or downwardly movably supported by a coupling rod 89, from which a rear link 90 extends forward. The rear link 90 and the upper link 88 are upwardly or downwardly movable by the adjusting lever 51 through a coupling link 91.

To lift the mower 2, the lift arms 79 are turned by the hydraulic unit 76 upward about the arm shaft 78 in the direction of an arrow in FIG. 12, causing the inner wires 82 of the push-pull wires 80 to pull the connecting rods 56 of the flexible link assemblies 16 upward, whereby the flexible link assemblies 16 are flexed substantially to the same extent to lift the mower 2 straightforwardly. This embodiment utilizes the hydraulic unit 76 as the lifting means 17 and therefore has the advantage of being simpler and less expensive than those including the hydraulic cylinder 62.

Figure 14:
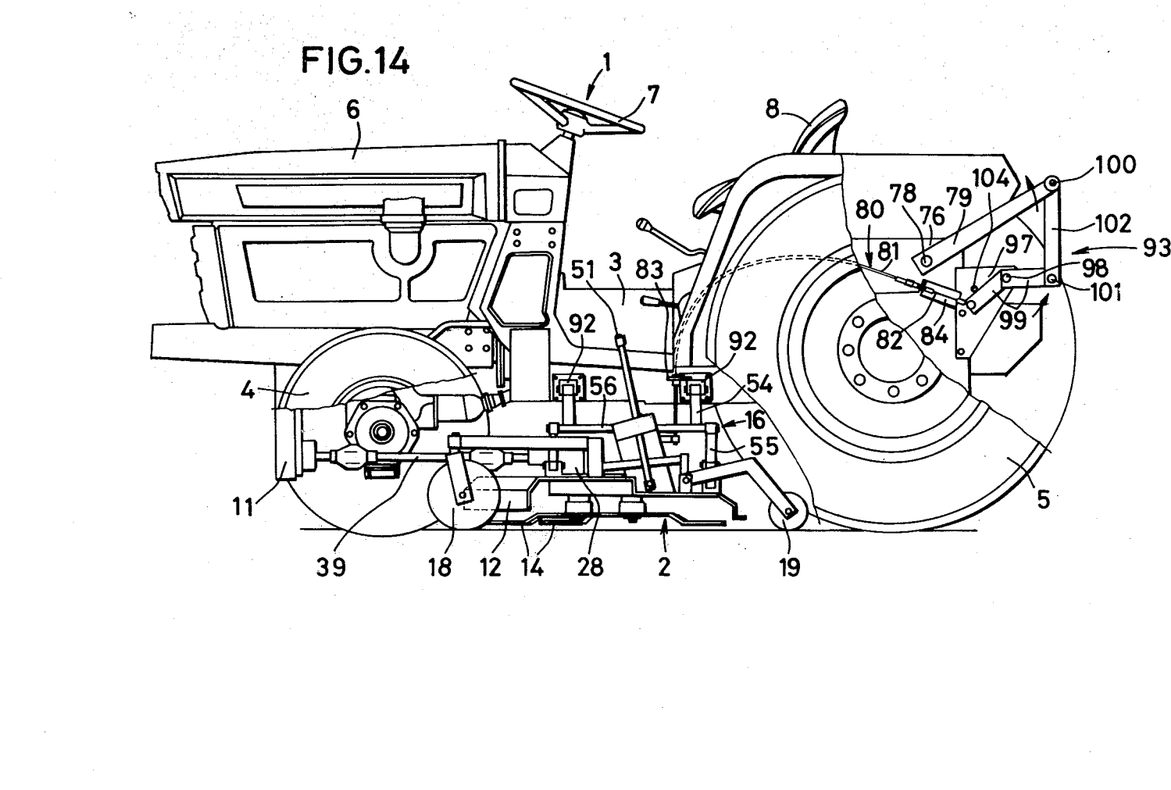
FIG. 14 is a side elevation showing a seventh embodiment of the invention with a farm tractor partly broken away.
Figure 15:
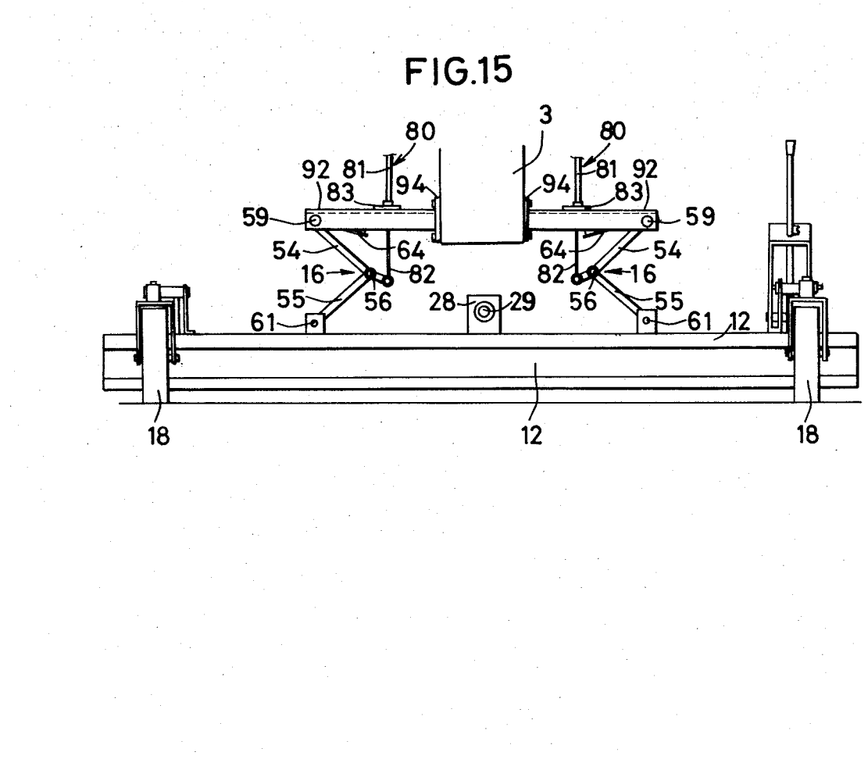
FIG. 15 is a fragmentary front view showing the same schematically.
Figure 16:
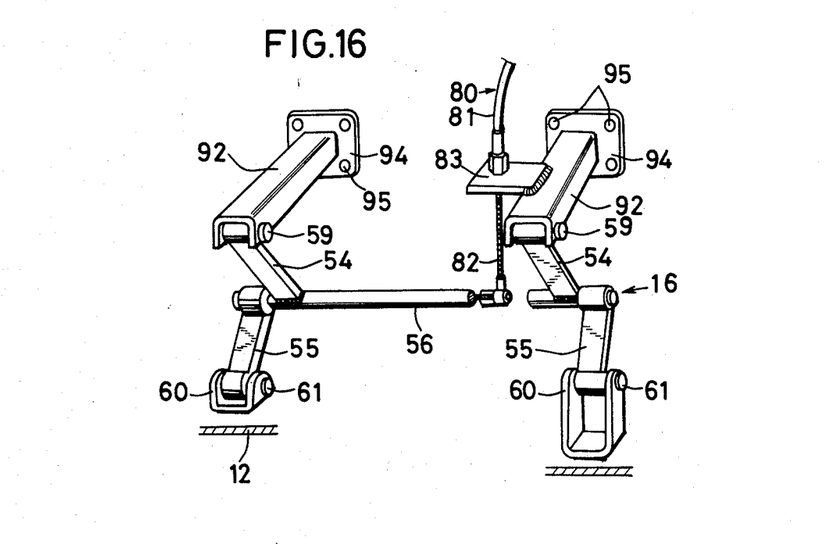
FIG. 16 is a perspective view showing a flexible link assembly on one side as it is seen from outside.

FIGS. 14 to 18 show another embodiment in which arms 92 for each flexible link assembly 16 are detachably attached directly to the tractor body 3. The embodiment further includes a safety assembly 93 between the push-pull wire 80 and the lift arm 79 for preventing the break of the inner wire 82. As seen in FIGS. 14 to 16, the mounting arms 92 for the flexible link assembly 16 are each provided for the upper link 54 independently of the other. Thus a pair of front and rear mounting arms 92 are provided for the assembly 16. Each of the arms 92 extends laterally outward and is detachably fastened to a lower portion of the tractor body 3 on each side thereof by a plate 94 and bolts 95. The upper link 54 is pivoted to the outer end of the arm 92 by a pin 59. Each rear mounting arm 92 is provided with an outer wire supporting member 83 for the outer wire 81 of the push-pull wire 80. Each of the arms 92 is further provided with a stopper 64 against which the upper link 54 bears when the mower 2 is lifted.

Figure 17:
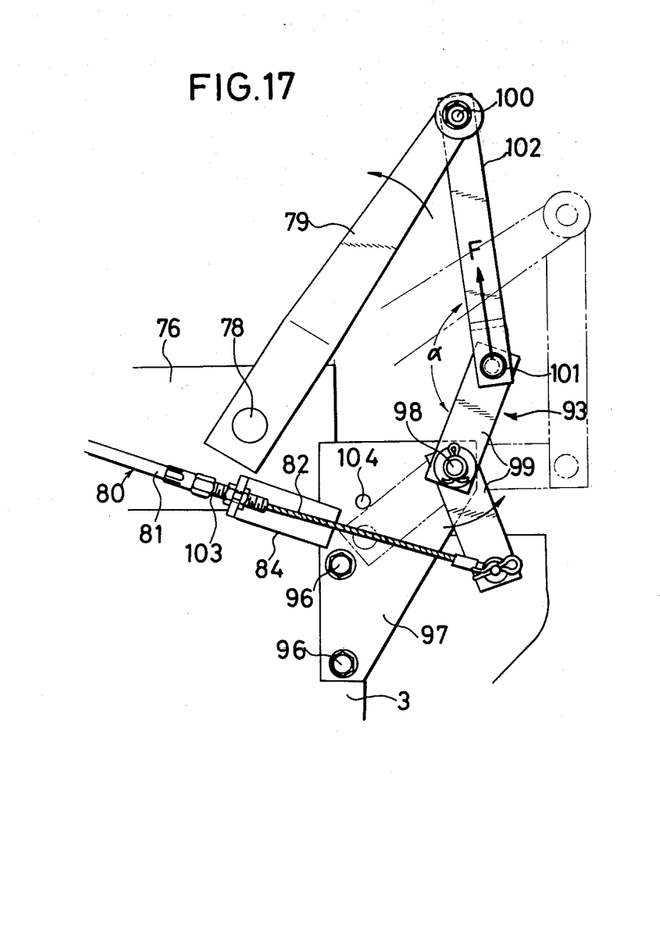
FIG. 17 is a side elevation showing a safety assembly with the embodiment in its lifted position.
Figure 18:
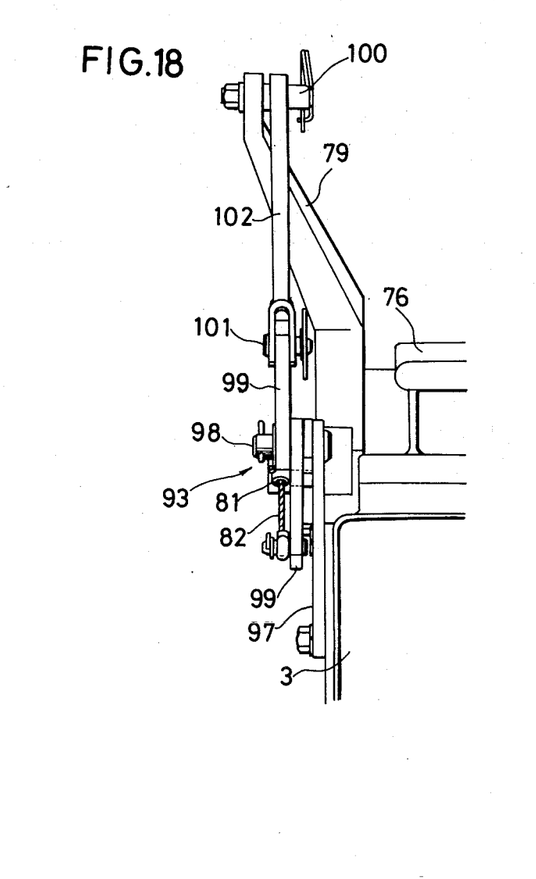
FIG. 18 is a rear view showing the same.

As illustrated in FIGS. 14, 17 and 18, the safety assembly 93 comprises a support bracket 97 secured by bolts 96 to each side of the tractor body 3 at a rear end upper portion thereof, a bell crank 99 having an intermediate portion supported by a pin 98 on the support bracket 97 upwardly or downwardly turnably, and a lift link 102 having one end connected to the free end of the lift arm 79 by a pin 100 and the other end connected to one end of the bell crank 99 by a pin 101. The push-pull wire 80 is connected to the other end of the bell crank 99. When the mower 2 has reached the upper limit of its movement, the bell crank 99 and the lift arm 102 are adapted to form the largest possible angle $\alpha$ therebetween. The outer wire 81 of the push-pull wire 80 is attached by an adjusting screw 103 to an outer wire support member 84 so as to be axially adjustable. The downward turn of the bell crank 99 is limited by a stopper 104.

To mount the mower 2 on the tractor body 3 with the arrangement stated above, the mounting arms 92 are fastened to both sides of the tractor body 3 by the plates 94 and bolts 95, and the upper links 54 are then connected to the outer ends of the arms 92 with the pins 59. Since the front and rear upper links 54 in each pair can be mounted in place individually, one link need not be supported while the other link is being connected. Thus the link assemblies are very easy to handle.

During mowing, the mower 2 is in the position shown in FIGS. 14 and 15. The bell cranks 99 are prevented by the stoppers 104 from turning downward. The mower 2 can be lifted by turning the lift arms 79 of the hydraulic unit 76 about the arm shaft 78 upward in the direction of an arrow in FIG. 17 to cause the lift links 102 to turn the bell cranks 99 in the direction of an arrow. This causes the inner wires 82 of the push-pull wires 80 to exert a lifting force on the connecting rods 56 of the link assemblies 16 and flexes the link assemblies 16 to lift the mower 2. The mower 2 stops rising upon the upper links 54 of the link assemblies 16 coming into contact with the stoppers 64 on the mounting arms 92. Subsequently the hydraulic unit 76 is brought out of operation. Although the lift arms 79 of the unit 76 exerts a lifting force F on the lift links 102 during the period following the stop of upward movement of the mower 2 until the unit 76 is brought out of operation, the component of the force F acting on the bell cranks 99 as a torque is small, because the lift links 102 and the bell cranks 99 are in the position shown in FIG. 17 with a very large angle α formed therebetween. Thus the tension on the inner wires 82 while the upper links 54 are in bearing contact with the stoppers 64 can be reduced to prevent the break of the inner wires, or deformation of or damage to other components.

Figure 19:
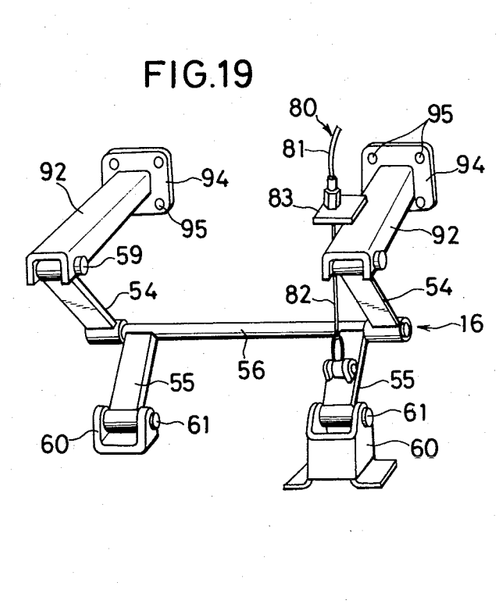
FIG. 19 is a perspective view showing a flexible link assembly according to an eighth embodiment of the invention.

The inner wire 82 of the push-pull wire 80 can be connected to the lower link 55 of the link assembly 16 as seen in FIG. 19, or directly to the mower frame 12.

Figure 20:
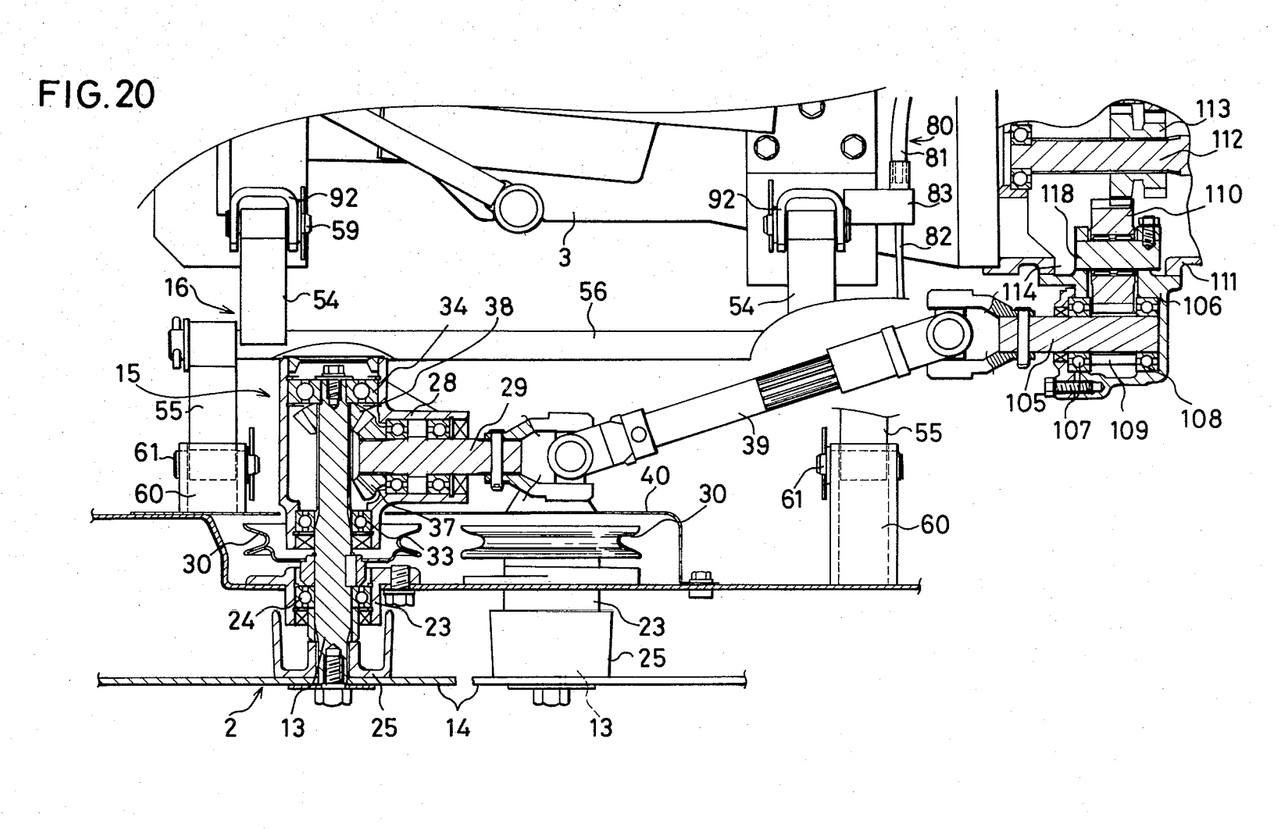
FIG. 20 is a fragmentary side elevation showing a ninth embodiment of the invention with a power system shown in section.

FIG. 20 shows an embodiment in which a mid-PTO shaft 105 is adapted to deliver power to the mower. The PTO shaft 105 is rotatably supported by ball bearings 107 and 108 housed in a power take-off case 106. The PTO shaft 105 is integral with a gear 109 meshing with an intermediate gear 110, which in turn is in mesh with a speed-change slidable gear 113 on a speed-change shaft 112 housed in a transmission case 111. The intermediate gear 110 is freely rotatably mounted on an intermediate shaft 118 attached to the power take-off case 106, which is attached to the bottom wall of the case 111 to close an opening 114 therein. The gear box 28 has an input shaft 29 projecting rearward and coupled to the mid-PTO shaft 105 by a universal joint shaft 39.

This arrangement is very advantageous when the hydraulic unit 76 is utilized as the lifting means 17, because the universal joint shaft 39 can be disposed in a space produced to the rear of the drive unit 15 in this case. When the front power take-off unit 11 is utilized, the universal joint shaft 39 must be disposed longitudinally of the tractor body below the front axle case. The level of the mower 2 above the ground will then be invariably limited in order to hold the universal joint shaft 39 out of contact with the front axle case when the mower 2 is lifted. Such objection is avoidable when the mid-PTO shaft 105 is utilized for power take-off, permitting rise of the mower 2 to a higher level. The power take-off case 106, projecting downward from the transmission case 111, is preferably disposed to the rear of the mower frame 12.

Although the flexible link assemblies 16 of the foregoing embodiments comprise a connecting rod 56 and upper links 54 connected to the rod integrally therewith, the connecting rod 56 may be made integral with the lower links 55, with the upper links 54 fitted to the rod 56 and made turnable relative thereto.

Further although the mower 3 is adapted to be attached to the bottom of the farm tractor 1, the mower 3 is mountable on various vehicles other than such tractors.

The drive unit 15 can be driven by a hydraulic motor or like drive source other than the power from the tractor body 3 to achieve the same result.

A coiled spring or like tension spring is usable for the safety assembly 93.

What is claimed is:

1. A mid-mounted mower comprising a mower frame disposed below a vehicle body and adapted to be run by the vehicle body in contact with the ground during mowing, cutting blades rotatably supported by the mower frame, a drive unit constituting at least part of a system for driving the blades and mounted on the mower frame, a pair of opposed flexible link assemblies upwardly or downwardly movably suspending the mower frame from the vehicle body, and lifting means for upwardly or downwardly moving the mower frame by flexing or stretching the flexible link assemblies substantially to the same extent, the flexible link assemblies being each flexible only about an axis extending longitudinally of the vehicle body, whereby the mower frame is adapted to remain in contact with the ground during the travel of the vehicle body without permitting the mower frame to move relative to the vehicle body longitudinally thereof, and said link assemblies being flexible each about its axis independently of each other to cause the mower frame to follow the ground during mowing.

2. A mid-mounted mower as defined in claim 1 wherein each of the flexible link assemblies comprises a pair of front and rear upper links and a pair of front and rear lower links, and the pair of upper links is flexibly connected to the pair of lower links by a connecting rod extending longitudinally of the vehicle body, one of the pairs of the upper links and lower links being fixed to the connecting rod.

3. A mid-mounted mower as defined in claim 2 wherein the connecting rod is disposed laterally inwardly of support pins on the outer ends of the links.

4. A mid-mounted mower as defined in claim 1 wherein the flexible link assemblies are provided with stoppers for limiting the flexing of the link assemblies in the mower lifting direction with the mower in its lifted position.

5. A mid-mounted mower as defined in claim 1 wherein the mower frame has an upwardly projecting discharge guide at its front portion for discharging the grass cropped by the cutting blades sidewise of the vehicle body, and the drive unit is disposed to the rear of the discharge guide.

6. A mid-mounted mower as defined in claim 1 wherein the lifting means is a cylinder connected between the pair of opposed flexible link assemblies in a lateral position.

7. A mid-mounted mower as defined in claim 1 wherein each of the flexible link assemblies comprises a pair of front and rear upper links and a pair of front and rear lower links, and the pair of upper links is flexibly connected to the pair of lower links by a connecting rod extending longitudinally of the vehicle body, a cylinder serving as the lifting means and being connected in a lateral position between the connecting rods.

8. A mid-mounted mower as defined in claim 1 wherein a universal joint shaft is disposed in front of the drive unit for coupling the drive unit to a front power take-off unit on the vehicle body, and a cylinder serving as the lifting means is positioned to the rear of the drive unit and connected in a lateral position between the pair of opposed flexible link assemblies.

9. A mid-mounted mower as defined in claim 1 wherein the lifting means comprises a hydraulic unit mounted on the vehicle body, and the flexible link assemblies are connected by push-pull wires to a pair of opposed lift arms of the hydraulic unit.

10. A mid-mounted mower as defined in claim 7 or 8 wherein at least one end of the cylinder is connected to the flexible link assembly by a lateral idly movable portion, and the flexible link assemblies are flexible or stretchable during operation within a range defined by the idly movable portion.

11. A mid-mounted mower as defined in claim 1 or 9 wherein a universal joint shaft is disposed to the rear of the drive unit for coupling the drive unit to a mid-PTO shaft on the vehicle body.

12. A mid-mounted mower as defined in claim 9 wherein a safety assembly is provided between each of the lift arms and each of the push-pull wires for preventing abnormal tension from acting on the push-pull wire when lift of the mower is limited.

* * * * *